Sept. 3, 1963 D. K. ISBELL ETAL 3,102,608
VEHICLE BRAKE
Filed Nov. 3, 1960 4 Sheets-Sheet 1

INVENTORS
DONALD K. ISBELL
LASZLO NAGY
BY

INVENTORS
DONALD K. ISBELL
LASZLO NAGY
BY
Arthur L. Nelson

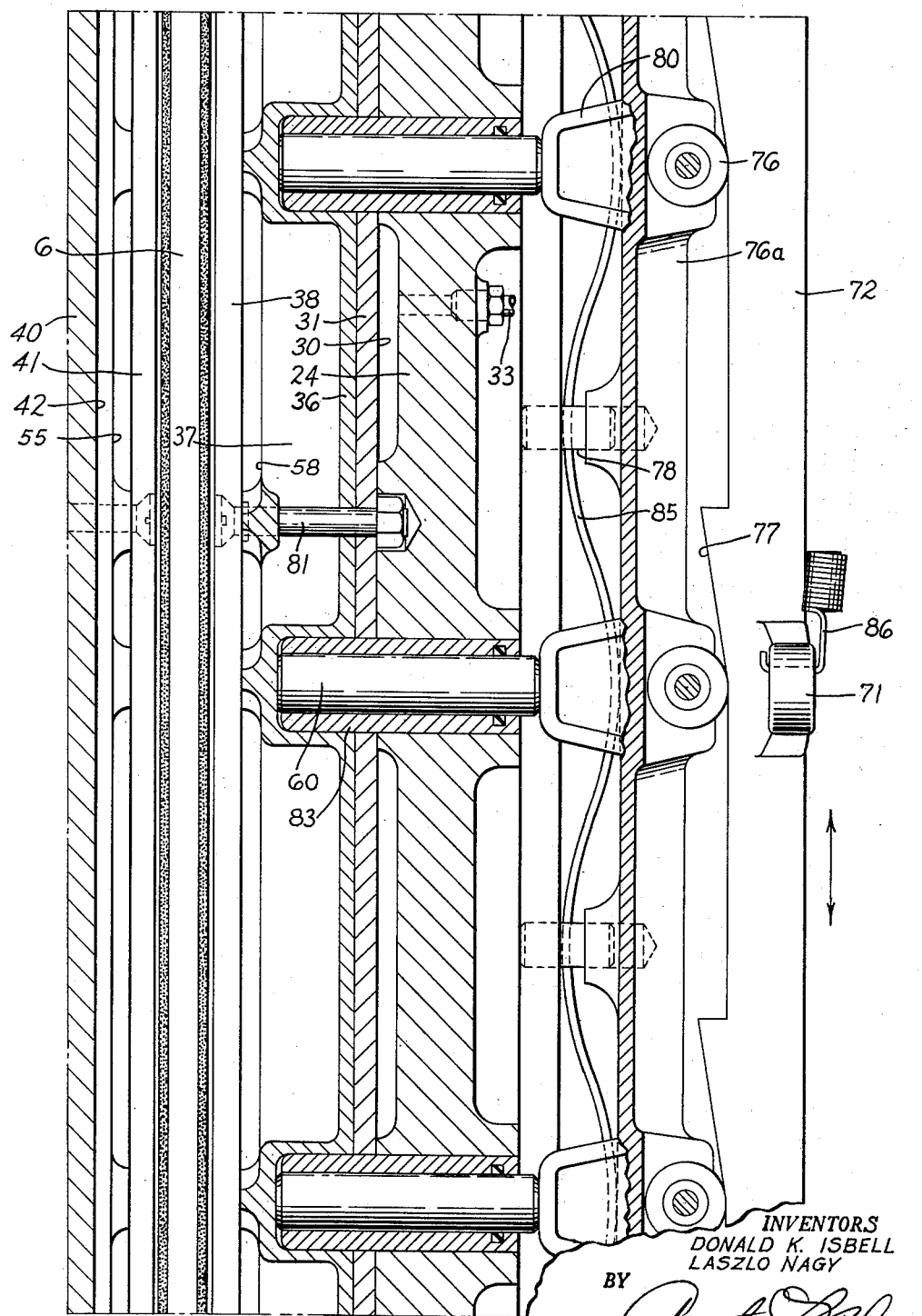

3,102,608
VEHICLE BRAKE
Donald K. Isbell, Pontiac, and Laszlo Nagy, Detroit, Mich., assignors to General Motors Corporation, Detroit, Mich., a corporation of Delaware
Filed Nov. 3, 1960, Ser. No. 67,021
1 Claim. (Cl. 188—72)

This invention relates to a vehicle brake and more particularly to a mechanical means for actuating a vehicle brake in combination with a parallel fluid operating means for actuating the vehicle brake.

Due to the size and the load carrying capacity of the present day cargo carrying vehicle it is necessary that the brakes for the vehicle have considerable capacity. A large capacity brake generates considerable heat which must be conducted to an external point to cool the brake particularly a vehicle disk brake which is inherently a very compact arrangement for a brake.

Accordingly, a fluid system is often necessary to provide adequate cooling for satisfactory braking. It is further necessary that an actuating means be provided to create a sufficient pressure between the brake disks in the retarding of the motor vehicle. Accordingly, this invention has intended to accomplish this purpose. The braking means are accomplished through a hydraulic means for actuating the vehicle brakes and also a mechanical means having a high mechanical advantage to actuate the same braking means to provide adequate braking through mechanical means.

It is an object of this invention to provide a cooling fluid system for cooling the vehicle brake and also a parallel arrangement of a mechanical means having a high mechanical advantage and hydraulic means for actuation of the vehicle brake.

It is another object of this invention to provide a hydraulic means for actuating a vehicle brake and also a parallel arrangement having a high mechanical advantage to actuate the vehicle brake in substantially the same manner.

It is a further object of this invention to provide a mechanical means for actuation of the vehicle brakes through a cam and roller arrangement providing adequate thrust for brake actuation in event of hydraulic failure.

It is a further object of this invention to provide a cam actuated lever arrangement whereby the vehicle brakes are actuated through a high mechanical advantage to provide a concentric and equal thrust on all portions of the vehicle disk brakes.

The objects of this invention are accomplished by constructing a vehicle brake having a cooling system for circulating cooling fluid through the vehicle disk brake. The vehicle brake disk is connected to the vehicle wheel and rotates at all times when the vehicle wheel is in rotation. A backing plate and a pressure plate are also provided adjacent to the brake disk but connected to a stator member within the vehicle wheel. A cooling fluid system is arranged to provide rapid transfer of heat through a metal of high heat conduction which axially engages the brake disk. The cooling fluid is circulated to contact a metal of high conductivity and thereby pick up the heat which is conveyed to an external point and radiated to the atmosphere through a heat exchanger.

The vehicle disk brake is actuated through a hydraulic means. The hydraulic fluid system is connected to a master cylinder which is also in communication with an annular hydraulic wheel cylinder which actuates the pressure plate creating a thrust between the pressure plate and the backing plate to frictionally engage the rotating brake disk and thereby create a retarding force on the vehicle wheel. The hydraulic wheel cylinder and piston are sealed by a diaphragm means which provides a minimum of friction and leakage during movement of the piston relative to the cylinder and thereby provides maximum actuating force and actuation of the vehicle disk brake.

A mechanical arrangement is also constructed in combination with the vehicle disk brake. The mechanical arrangement comprises a manual means for rotating a cam ring which is rotatably mounted on the shaft housing. A roller ring is also concentrically mounted with the cam ring which engages the hydraulic annular piston for actuation of the vehicle brakes. As the cam ring is manually rotated, the roller ring is thrust axially which engages axially extending pins which operate the hydraulic piston within the hydraulic wheel cylinder. The angle of the contour of the cam controls the mechanical advantage of the mechanical actuating means. Due to the roller construction and anti-friction means throughout the mechanical actuating means, the high axial thrust is possible to create adequate braking effort in actuation of the hydraulic annular piston thrusting in an axial direction similar to the movement created by a hydraulic means. In this manner, a hydraulic means and a mechanical means are provided to actuate the vehicle disk brake for a maximum efficiency within a vehicle disk brake.

Further objects and advantages of the present invention will be apparent from the following description, reference being had to the accompanying drawings wherein preferred embodiments of the present invention are clearly shown.

In the drawings:

FIG. 4 is a development view as indicated on the radius 4—4 shown in FIG. 3.

Figure 1:
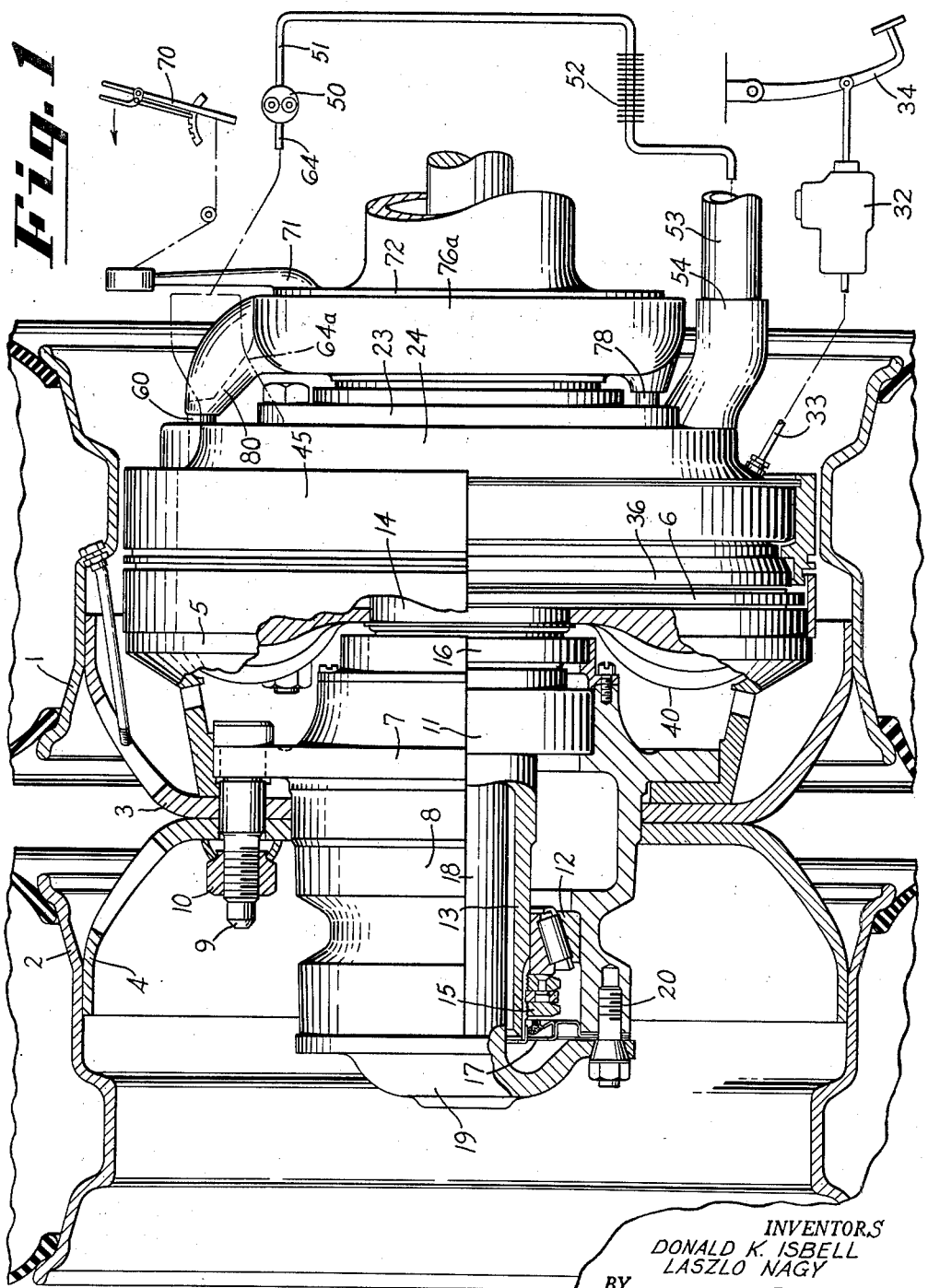
FIG. 1 is an axial arrangement view of a vehicle brake embodying manual and hydraulic actuating means, including a cooling fluid system.
Figure 2:
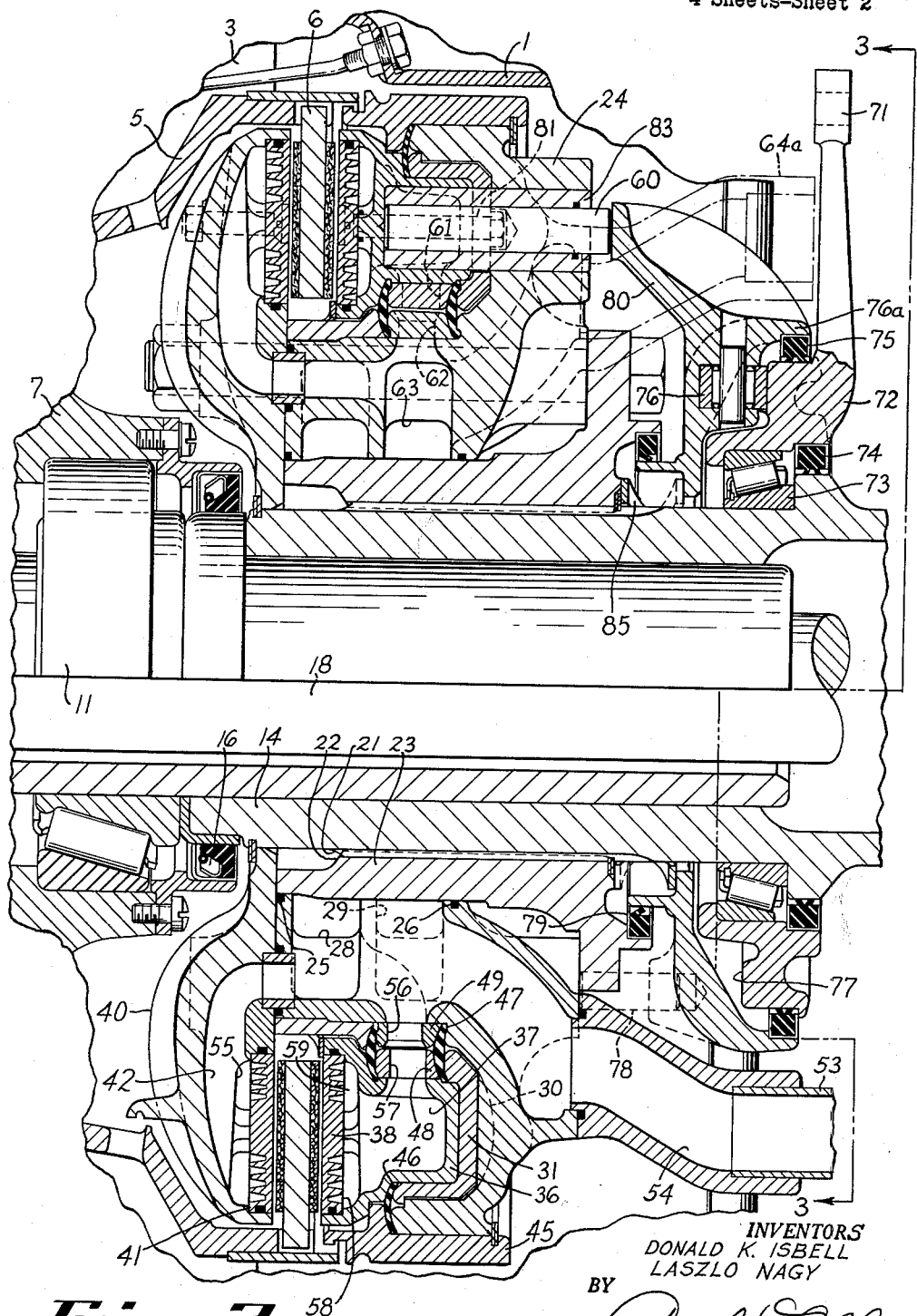
FIG. 2 is a substantially enlarged cross section view of the inboard portion of the vehicle brake actuating means and cooling fluid system.

Referring to FIG. 1 the vehicle disk brake is shown by an axial arrangement of parts and FIG. 2 is a portion of FIG. 1 in cross section. The dual rims 1 and 2 are mounted on the wheels 3 and 4. The brake disk carrier 5 is also mounted adjacent and concentric with the wheels 3 and 4 and extends axially inboard to support the rotatable brake disk 6 by suitable means such as mating splines. Axial movement of disk 6 for brake operation may be accommodated by the spline arrangement. The brake disk 6 is provided with a frictional material on the planar surfaces of the lateral portion of the disk.

The vehicle wheels 3 and 4 are mounted on the radial flange 7 of the wheel hub 8 by means of a plurality of bolts 9 and nuts 10. The hub 8 is rotatably mounted on the inboard bearing assembly 11 and the outboard bearing assembly 12 which are supported on the extension 13 of the shaft housing 14. The bearing assemblies 11 and 12 are maintained in adjustment by the adjustment nut 15. The bearing assembly 11 is sealed by the inboard seal 16 and the bearing assembly 12 is sealed by the outboard seal assembly 17. The vehicle wheels 3 and 4 are rotated by means of the drive shaft 18 which has a radial flange 19 which is fastened to the hub 8 by a plurality of bolts 20.

The braking structure is mounted within the inboard wheel 3. The braking structure is mounted on the shaft housing 14. The outer periphery of the shaft housing 14 has a splined portion 21 which mates with the splined portion 22 of a brake supporting sleeve 23. The brake supporting sleeve supports the braking structure on its inner periphery. The hydraulic wheel cylinder 24 is mounted on the outer periphery of the brake supporting sleeve 23 with seals 25 and 26 engaging the mating surfaces of the hydraulic wheel cylinder 24 and the brake support sleeve 23. The hydraulic wheel cylinder is formed with the annular inlet passage 28 and the annular outlet passage 29 on the inner periphery of the hydraulic wheel cylinder. The hydraulic wheel cylinder forms the actuating chamber 30 with the hydraulic wheel piston 31. The annular hydraulic wheel piston 31 and the annular hydraulic cylinder 24 form the actuating chamber for actuating the vehicle brakes which is in communication with the hydraulic master cylinder 32 through conduit means 33. The hydraulic master cylinder is actuated by the brake pedal 34. The axial outboard side of the annular hydraulic wheel piston 31 has a contour meeting the axially inboard side of the pressure plate support member 36. The pressure plate support member forms a cooling chamber 37 with the pressure plate 38. The pressure plate 38 has seals on its inner and outer periphery which are received in mating grooves on the engaging portion of the brake support member 36.

The backing plate support member 40 is mounted on the outer periphery of the shaft housing 14 and engages the outboard side of the brake support sleeve 23. The backing plate support member 40 supports the backing plate 41, and forms a cooling chamber 42 with the backing plate 41. The backing plate 41 is sealed on its inner and outer periphery by seals placed in annular recesses in the mating portion of the backing plate support member 40.

The annular hydraulic wheel piston 31 is permitted to move relative to the annular hydraulic wheel cylinder 24. The pressurizing chamber for actuating the brakes and moving the hydraulic wheel piston 31 relative to the hydraulic wheel cylinder 24 is formed by the piston and the cylinder and sealed by diaphragms. The radially outer portion of the hydraulic wheel piston is sealed between the pressure plate support member 36 and the hydraulic wheel piston 31. This diaphragm is sealed on its inner periphery in this manner and on the outer periphery between the brake housing 45 and the hydraulic wheel cylinder 24. The diaphragm 46 thereby flexes as the annular hydraulic piston 31 moves relative to the annular hydraulic wheel cylinder 24.

The inner periphery of the annular hydraulic wheel piston 31 and the inner periphery of the pressure plate support member 36 are sealed by the diaphragm 47. The spacer 48 and the annular hydraulic wheel piston 31 engage the outer periphery of the diaphragm 47. The inner periphery of the diaphragm 47 is sealed by the spacer 49 and the annular hydraulic wheel cylinder 24. The intermediate portion of the diaphragm 47 is permitted to flex as the annular hydraulic wheel piston 31 moves axially relative to the annular hydraulic wheel cylinder 24. The diaphragms 46 and 47 provide the sealing means for the pressurizing chamber 30 within the annular hydraulic wheel cylinder 24. As the fluid is pressurized within the master cylinder 32 the pressure is also increased within the conduit means 33 and the pressurizing chamber 30 thereby actuating the vehicle brakes.

The cooling fluid system includes a pump 50 and a conduit means 51 connecting the pump to a heat exchanger 52. The inlet conduit 53 is in communication with the heat exchanger 52 and the inlet port 54 in the vehicle brakes. The pressurized fluid passes through the heat exchanger 52 to the inlet port 54 and the annular passage 28. Fluid passes radially through the cooling chamber 42 and the arcuate chamber 55 adjacent the backing plate 41. The fluid also passes radially through the openings 56 and 57 in the spacers 49 and 48 respectively. The fluid passes into the cooling chamber 37 and the arcuate passages 58 and 59, thereby cooling the pressure plate 38. The pressure is then permitted to move radially inward from the cooling chamber 55 and a cooling chamber 37. The cooling chamber 37 is in communication with the openings 61 and 62.

The fluid is fed from the cooling chamber 37 through the openings 61 and 62 in the spacers 48 and 49 respectively. The fluid from the cooling chambers 55 and 37 then feeds through the annular chamber 63 which is in communication with the outlet conduit 64 through the outlet port 64a in the braking means. In this manner the cooling fluid is circulated through the braking means to provide cooling of the pressure plate and the backing plate.

The manual operating means 70 is provided to actuate the mechanical brake actuating mechanism. The mechanical brake actuating mechanism includes the arm 71 which is a part of the cam ring 72 which is rotatably mounted on the bearing assembly 73. Roller or ball bearing assemblies are preferably used. The seals 74 and 75 are mounted on the inner periphery and outer periphery of the cam ring 72.

Figure 3:
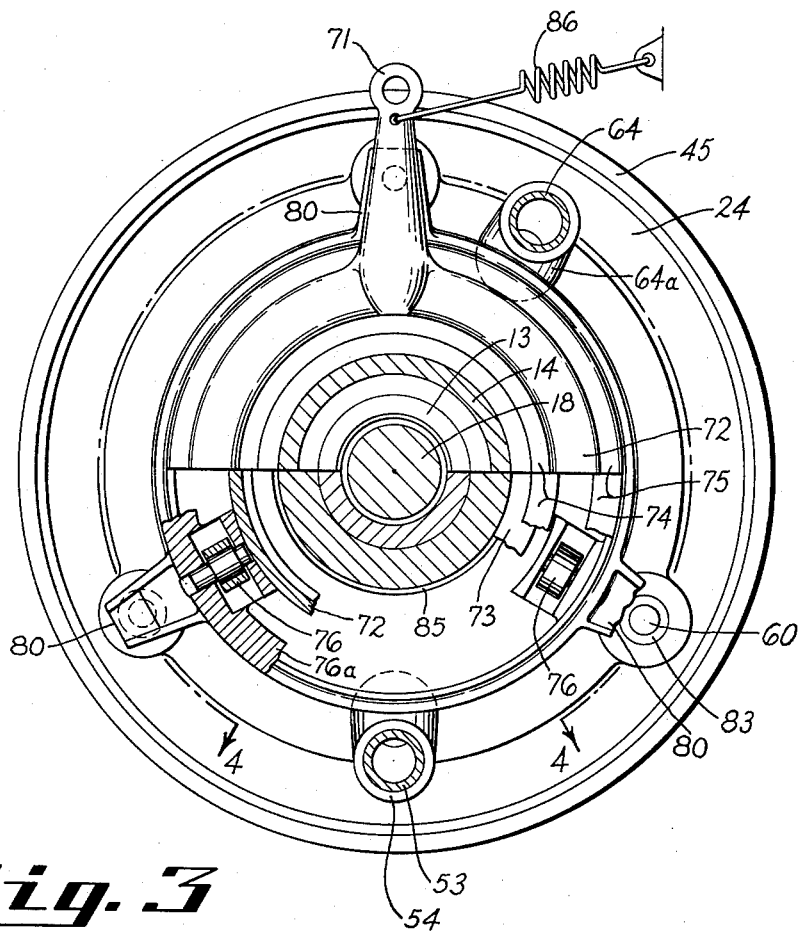
FIG. 3 is a cross section view of the inboard end taken on lines 3—3 of FIG. 2.

Referring to FIG. 3 the arm 71 is more clearly shown in the relationship to the cam ring 72. The cam ring engages the plurality of rollers 76 which are mounted in the roller ring 76a. The rollers 76 have an axis which is radial relative to the drive shaft 18. The cam ring 72 has a plurality of cam surfaces 77 formed on the outboard surface to engage the plurality of rollers 76. By rotational movement of the cam ring 72 the rollers 76 engage the cam surface 77 biasing the rollers 76 to an axial position axially relative to the cam ring 72. The roller ring 76a is maintained in a non-rotative position relative to the brake support sleeve 23 by a plurality of the pins 78. The roller ring is sealed on its outboard side by the seal 79.

As the roller ring 76a is moved axially in response to the rotation of the cam surfaces 77 the plurality of arms 80 engage the pins 69. Each of the pins 69 extends into the annular hydraulic wheel cylinder 24 through an anchoring sleeve 83. The pin and sleeve extend into the piston 31 to actuate the piston and the pressure plate support member 36, the pressure plate support member 36 being connected to the pressure plate 38 by bolts 81.

The spring 85 provides a means for retraction of the roller ring 76a when the brakes are released. The spring 86 seen in FIG. 4 counter rotates the cam ring 72 to its normally retracted position when the manually operating means is released.

The disk brake operates in the following described manner. The cooling system includes the cooling pump 50 which circulates the cooling fluid through the heat exchanger 52 through the conduit means 53 and the inlet passage 54. Fluid is then circulated to the inner periphery of the braking means and passes radially outward through the passage 42 and passages 56 and 57. The fluid is then circulated circumferentially through the arcuate passages 55, 58 and 59 where the fluid contacts the backing plates and the pressure plate respectively to provide a cooling of the braking means. The fluid is also permitted to pass through the annular passage 28 and radially outward through a plurality of passages similar to the radial passages described. In this manner the backing plate and the pressure plate are cooled and the fluid is then permitted to return through outlet passages similar to those forming the inward passages to return to the annular passage 63. The annular passage 63 is in communication with the conduit means 64a and 64 and is permitted to return the cooling fluid to the cooling pump 50. The dry surface of the frictional engaging portion of the brake increases the effectiveness of the brake and yet the cooling of the brake is adequate as a metal having a high thermal conductivity is employed in the pressure plate and the backing plate.

The vehicle brakes are hydraulically actuated by the brake operating lever 34. As the lever 34 is depressed the fluid is pressurized within the master cylinder 32 and the conduit means 33 and the actuating chamber 30 in the vehicle brake. As the fluid is pressurized within the actuating chamber 30 the hydraulic piston 31 moves axially within the annular hydraulic wheel cylinder 24.

The chamber is sealed by the diaphragms 46 and 47 which permit the axial movement of the piston relative to the cylinder with a minimum of friction. The piston moves to frictionally engage the pressure plate with the brake disk as well as causing the brake disk to frictionally engage the backing plate thereby causing retardation of the vehicle wheel as the vehicle brakes are actuated.

The vehicle brake is also provided with a mechanical means for actuation of the vehicle brakes. The brake lever 70 is connected to actuate the arm 71 on the cam ring 72. As the lever 70 is actuated the cam ring 72 rotates on the bearing assembly 73. The cam surfaces 77 engage the rollers causing an axial movement of the rollers which are carried on the roller ring 76a. The roller ring 76a also carries a plurality of arms 80 which extend radially to engage the pins 60. The pins 60 are mounted in the sleeve 83 which extend through the annular hydraulic wheel cylinder and the annular hydraulic wheel piston to engage a pressure plate support member 36. As the roller ring 76a is moved axially due to the biasing force of the rotation of the cam ring 72 the roller ring 76a moves the annular hydraulic wheel piston axially by forcing the pins 60 axially thereby frictionally engages the pressure plate 38 with the brake disk 6 and further engages the brake disk 6 with the backing plate 41. Due to the small inclination of the cam surface 77 of the cam member 72 the high mechanical advantage is achieved. The brakes are mechanically actuated in much the same manner as they are through the hydraulic fluid system.

As the brakes are released the roller ring is biased inboard by the helical spring 85 positioned between the brake supporting sleeve 23 and the roller ring 76a. With the movement of the roller ring the clearance again is provided between the brake disk and the pressure plate and the backing plate to release the brakes.

While the embodiments of the present invention as herein disclosed, constitute preferred forms, it is to be understood that other forms might be adopted.

What is claimed is as follows:

A vehicle disk brake comprising in combination, a stationary member, a rotating member rotatably mounted on said stationary member, a rotating disk rotatably secured to said rotating member and axially movable relative thereto, a backing plate operatively connected to said stationary member and in surface friction engageable relation with said rotating disk, a pressure plate mounted for axial movement on said stationary member for frictionally engaging said rotating disk with said backing plate, cylinder means operatively secured to said stationary member, anchor sleeve means mounted on said cylinder means, piston means including piston actuating pin means mounted within said cylinder means and extending through said anchor sleeve means and forming an actuating chamber, diaphragm means forming sealing means between said piston means and said cylinder means in said pressure actuating chamber, said piston means being axially movable and operatively connected with said pressure plate to move said pressure plate into frictional engagement with said rotating disk and said rotating disk into frictional engagement with said backing plate, hydraulic fluid pressurizing means in communication with said actuating chamber to provide actuation of said piston means to actuate said vehicle brakes, mechanical actuating means concentrically located on said stationary member including manual actuating means, a cam ring having a cam surface thereon and connected to said manual actuating means, anti-friction means mounted on said stationary member providing a rotational support for limited rotation of said cam ring on said anti-friction means, a roller ring and means mounting said roller ring on said stationary member for relative axial movement, a plurality of rollers on said roller ring engaging said cam surface on said cam ring, and a plurality of arms extending radially on said roller ring to engage said piston actuating pin means for providing an axial actuating force from said roller ring to said piston means to actuate said vehicle brakes mechanically.

References Cited in the file of this patent
UNITED STATES PATENTS

| | | |
|---|---|---|
| 2,835,357 | Kelley et al. | May 20, 1958 |
| 2,973,836 | Klaue | Mar. 7, 1961 |